Oct. 11, 1932.                J. L. STEVENS                1,882,045
                           FILTERING APPARATUS
                          Filed July 28, 1930      2 Sheets-Sheet 1

INVENTOR
James L. Stevens
BY
ATTORNEYS

Oct. 11, 1932.  J. L. STEVENS  1,882,045
FILTERING APPARATUS
Filed July 28, 1930    2 Sheets-Sheet 2
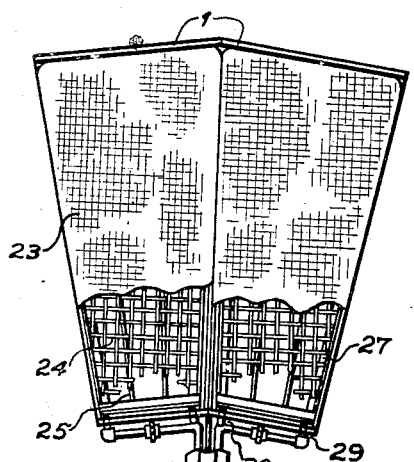
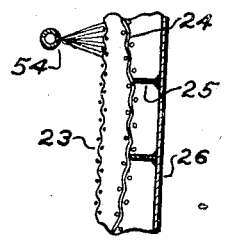
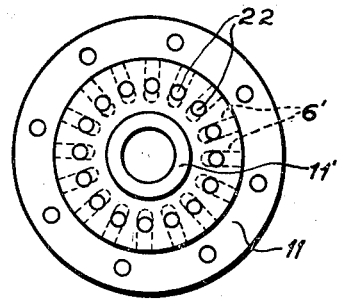
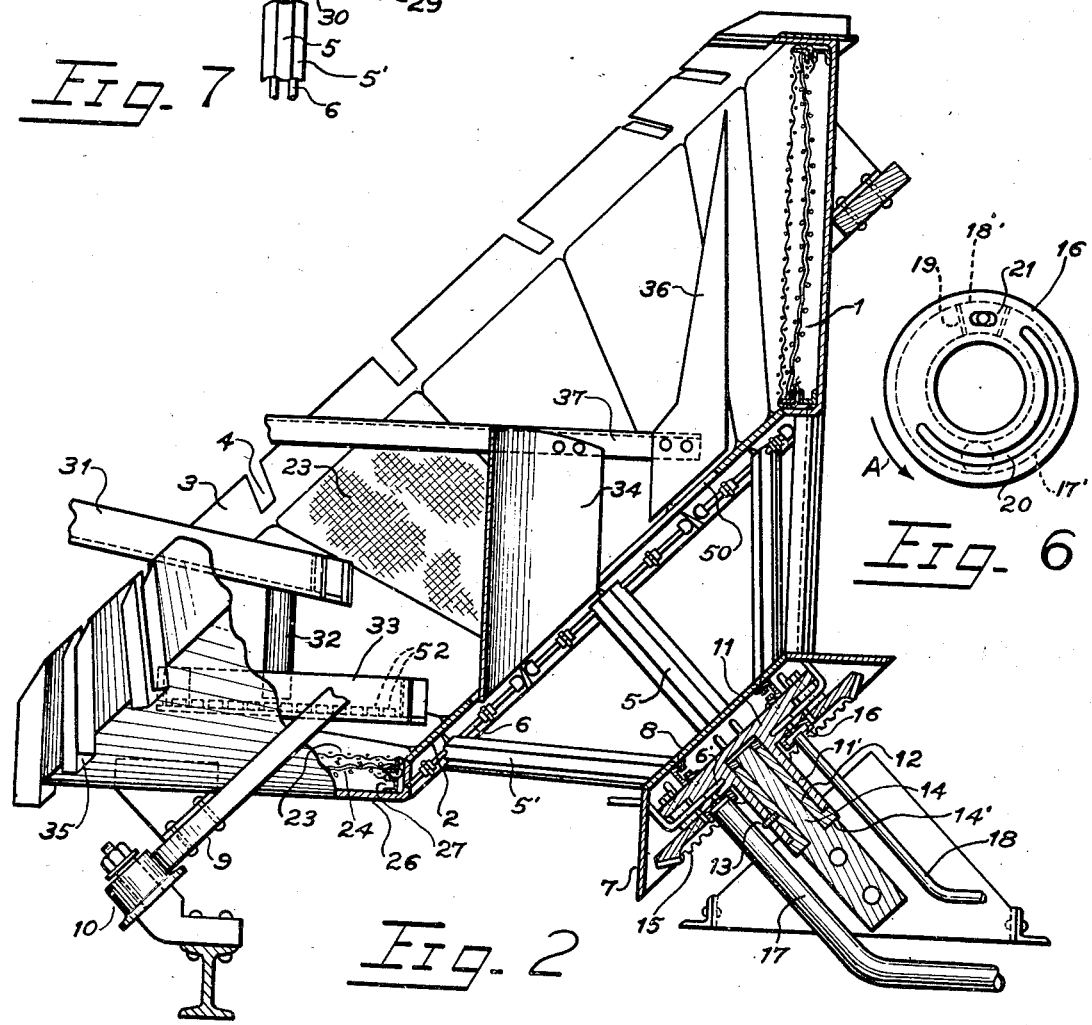
INVENTOR
James L. Stevens
BY Arthur P. Knight and
Alfred W. Knight
ATTORNEYS Patented Oct. 11, 1932

1,882,045

UNITED STATES PATENT OFFICE

JAMES L. STEVENS, OF HAYDEN, ARIZONA, ASSIGNOR TO RACONITE CHEMICAL COMPANY, OF HAYDEN, ARIZONA, A CORPORATION OF ARIZONA

FILTERING APPARATUS

Application filed July 28, 1930. Serial No. 471,204.

This invention relates to filtering devices and more particularly to rotary or continuous suction filters for separating solid particles from liquids, and has for its object certain provisions for improved method and apparatus for filtering.

One object of the present invention is to provide means for treating pulps containing course, heavy particles which are difficult to handle in many types of apparatus now employed for filtering. Another object is to permit a classification of particles of different size so that the coarser particles may settle on the filter first. Another object is to provide efficient means for removal of the liquid drawn through the filter. Another object of the invention is to provide means for removing part of the liquid without filtering and also permit removal of the more dilute slime pulp without filtering so that the major portion of this part of the liquid may be separated by settling and the thickened slime pulp subsequently filtered. A further object is to provide an apparatus capable of conveying the filtered solids to a desired point of discharge, and to provide a convenient, simple means for effecting the discharge of such solids. Another object is to provide means for washing the semi-dehydrated solids between the point of feeding the apparatus and the point of discharging the filtered solids. Other objects of the present invention will be obvious in the following description.

In order to accomplish the above mentioned and other objects of the present invention, I have constructed a filtering apparatus comprising a plurality of filter compartments arranged so as to form a shell of a frustum of a cone or polygonal pyramid having a porous filtering medium exposed at the inner surface and having a solid back or wall at the outer surface, with partitions and end walls so as to form compartments or recesses between the filtering medium and the solid back whereby suction and pressure may be applied separately to the filtering medium of the respective compartments at certain different positions during rotation.

The filter compartments are preferably equipped with a screen mounted between the filtering medium and the solid back so as to control the position of the filtering medium during the filtering operation and to provide ample space in the compartment for draining the filtered liquid.

The frustum of the cone or polygonal pyramid comprising the filtering compartments of the above described apparatus, preferably consists of a frustum of a cone or pyramid having approximately a 90° angle and truncated at a point approximately half-way between the apex and the periphery of the base. The frustum of the cone or pyramid is preferably placed in a semi-inverted position with the axis declining towards the apex end at an angle of approximately 45° from the horizontal so that certain of the filter compartments assume a substantially horizontal position, while opposite compartments assume a substantially vertical position. The position of the apparatus, may, however, be varied somewhat. For example, the frustum of a 90° cone or pyramid comprising the filter compartments may be placed so that the axis declining towards the apex end forms, say, an angle of about 40° from the horizontal. The angle of the cone or polygonal pyramid comprising the filter compartments may also vary somewhat and may be greater or less than 90°, but should not be, however, sufficiently acute or obtuse to hinder feeding and distributing the material to be treated, or to interfere in discharging the filtered solids from the apparatus. The size of the frustum, as related to a complete cone or pyramid, may also vary somewhat. However, the aperture at the truncated end should be sufficiently large to enable discharging the desired amount of filtered solids. In the foregoing, I have designated a point approximately half-way between the apex and the periphery of the base as being the optimum point of truncation to form a sufficiently large aperture.

The frusto conical filter, shaped and disposed as above described, and having a plurality of segmental filtering elements disposed at different angular positions about the axis thereof, is mounted in any suitable manner so as to permit rotation thereof about its inclined axis, and suitable gears or other means are provided for effecting such rotation.

A circular or annular baffle is placed, preferably at right angles to the axis, at the truncated end of the filter apparatus, so as to restrict the aperture sufficiently to prevent unfiltered material flowing through said aperture and going with the filtered solids. Another circular or annular baffle is provided at the periphery of the base and preferably placed at right angles to the filtering medium so that a certain amount of unfiltered material may be retained in the apparatus. The outer baffle is provided with overflow apertures which prevent accumulating an excess of unfiltered material in the filtering apparatus, and also provides means for discharging liquid and/or pulp from the apparatus without filtering.

In a preferred embodiment of the present invention, conduits are led from each of the various filter compartments along spoke-like members which extend from the filter towards the apex, to a valve device for applying suction and pressure to the various filter compartments at certain different positions during rotation, said valve device being located approximately at the apex end. The conduits are connected to the various filter compartments in such a manner as to provide efficient draining of the filtered liquid.

The suction may be applied at any suitable point, but is preferably applied to each compartment when said compartment reaches approximately the position at which the filter medium thereof is brought into contact with the material to be filtered. For example, the suction may be applied at the lowest point during rotation or on the descending side somewhat in advance of this point, and may continue to a point in close proximity with the point of applying the pressure for discharging the filtered solids.

The pressure is preferably applied at the point where the filter compartments approach the highest point and assume a vertical position. The pressure is effected by applying compressed air, steam, or the like to the filter compartment. The compressed air passes through the filtering medium and assist in discharging the filtered solids therefrom.

The material to be treated is preferably fed upon the filtering medium at or adjacent the point at which the suction is applied. The filtered solids are preferably discharged as the filter compartments approach the highest point during rotation, and are caused to fall through the aperture at the truncated end of the apparatus and through apertures between the spoke-like members containing the conduits in communicating with the filter compartments and the valve device. A baffle is provided to prevent the filtered product falling back into the unfiltered pulp.

In a preferred embodiment, the filter apparatus is mounted on a frame with a pivot bearing at the apex end and with bearing wheels engaged in a circular track attached to the outer portion of the filter, so as to support the filter and permit the same to be rotated. The gear for driving or rotating the apparatus is conveniently placed in close proximity with the pivot bearing at the apex end. A housing is provided at the apex end to protect the gears, valve device, bearing, etc. from contact with the discharging filtered solids. It will be understood, however, that any suitable means may be employed for rotatably supporting said apparatus for rotation about its axis, and for driving the same. In any case, however, such supporting and driving means should be so disposed as to permit free discharge of solids through the central opening at the truncated end of the filter, and suitable shield means may be provided, where necessary, to protect the parts from the discharged solids.

The apparatus is preferably provided with a scraper, preferably located at a point immediately following the blow or pressure, to assist in discharging the filtered solids. Another scraper is provided to prevent excess accumulation of filtered material on the spoke-like members.

From the foregoing description it is seen that the filtering apparatus of the present invention may be constructed to form the frustum of a cone or pyramid and therefore in some of the appended claims I have employed the term "conoidal pyramid" to include in a broad sense both a cone and a pyramid substantially as described. It will be observed that a cone may be considered as a special form of pyramid having an infinite number of sides, and that a polygonal pyramid approximates a cone more or less closely in any case. In either case, the respective segmental filtering compartments, and the filtering surfaces thereof, are inclined inwardly at an angle, say, between 40° and 50° toward the lower end of a common inclined axis of rotation, and the inclination of said filtering compartments and surfaces with respect to said axis of rotation is preferably approximately equal to the inclination of said axis with respect to the horizontal, so as to bring each filtering compartment approximately horizontal when in its lowermost or filtering position, the angle of the axis with respect to the horizontal varying somewhat, for example between 40° and 50°.

As stated above, however, the angle of the cone or pyramid comprising the filter compartments may be greater or less than 90 degrees, for example, the apex angle may vary between 80° and 100°. In some cases, particularly with the larger apex angles, it may be advantageous to position the filter so that the angle of the axis with respect to the horizontal is less than the angle of inclination of the surfaces of the filtering compartments with respect to the axis, in order that the surface of the filter compartments will more nearly approach the vertical when in their uppermost or discharging position, which is in general advantageous in promoting discharge of the solids by gravity through the central opening of the apparatus.

Referring to the accompanying drawings, forming part of this specification and illustrating by way of example one form of construction according to the present invention:

Fig. 2 is a view principally in section on line 2—2 in Fig. 1, but with a portion of the lower part of the apparatus shown in elevation.

Fig. 5 is an enlarged face view of the rotary valve plate.

Fig. 6 is an enlarged face view of the stationary valve plate.

Fig. 7 is a plan view of two adjacent filter compartments, showing a simple means of connecting the suction and pressure applying conduits thereto.

Fig. 8 is a section on line 8—8 in Fig. 1, showing the means for washing the solids on the filter medium.

Figure 1:
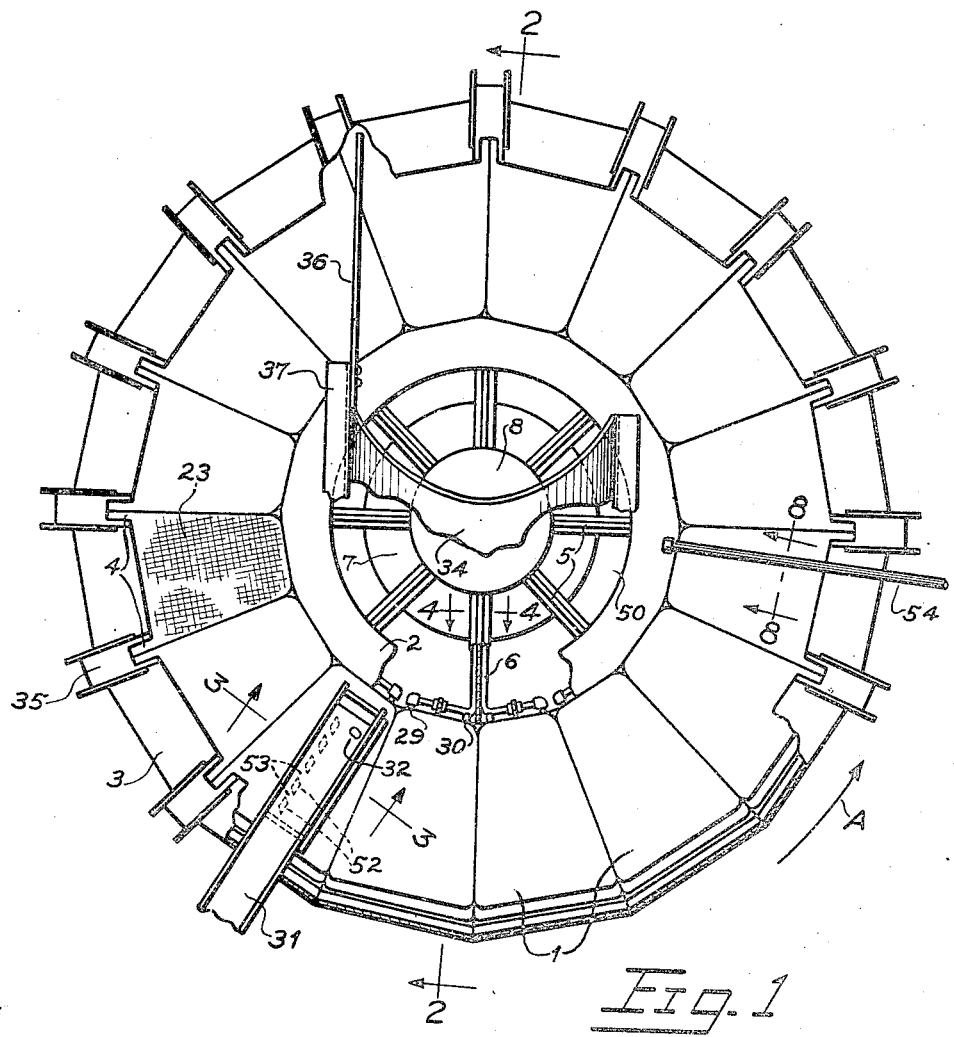
Fig. 1 is an inclined plan view, looking into the base or open end of the frustum-shaped filter, with the outer baffle partly broken away.

The filter is shown as comprising an annular series of filter compartments 1 disposed in the shape of a frustum of a polygonal or conoidal pyramid whose axis is positioned as above stated, the individual filter compartments being disposed at different angular positions about said axis. The filter is provided with a baffle member 2 at the inner or truncated end of the filter compartments defining a central aperture 50 through which the filtered solids may be discharged, and with a baffle member 3 at the outer rim of said filter compartments, said baffle members serving to maintain a supply of delivered material to be filtered upon the filtering medium of the filter compartments when in their lowermost or horizontal position. The outer baffle 3 is provided with a plurality of angularly spaced overflow apertures 4 each communicating with a chute or trough 35 for discharging unfiltered liquid or slime pulp, it being understood that any suitable launder or other means may be provided for receiving the material so discharged.

The filter further comprises angularly spaced spoke-like frame members 5 extending from the truncated end of the series of filter compartments toward the apex of the cone or pyramid and mechanically connected at their inner ends to a structure including baffle members 7 and 8 and rotary valve member 11. The baffle members 7 and 8 form a housing over the valve to protect the same from the discharging filtered solids. The rotary valve plate 11 is mounted to rotate with the filter and is provided with a central projecting portion 11' secured to bearing sleeve 12, as by means of set screw 13. Said bearing sleeve is rotatably mounted upon a stationary shaft 14 and engages against a shoulder 14' thereon, so that said shaft not only defines the axis of rotation of the filter, but also partially supports the weight thereof during rotation. A bevel gear 15 is secured to the rotating valve member and provides a convenient means for rotating the filter. A circular track 9 is secured outside the series of filter compartments and engages one or more bearing wheels 10 to assist in supporting the weight of the filter while rotating.

Figures 3, 4:
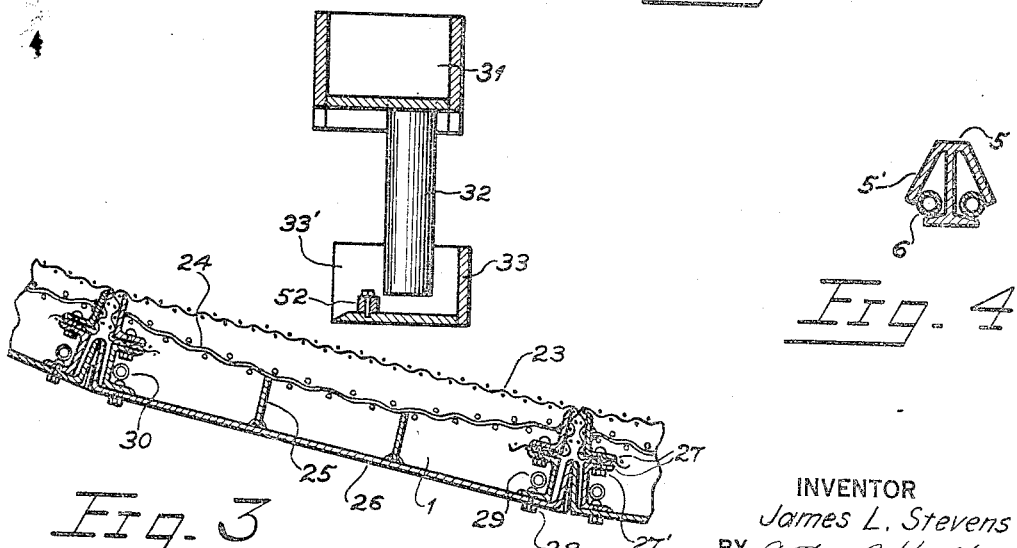
Fig. 3 is a sectional view of a filter compartment, and of the means for delivering material to be filtered, taken on line 3—3 in Fig. 1.
Fig. 4 is a sectional view of one of the spoke-like frame members and the conduit associated therewith, taken on line 4—4 in Fig. 1.

Referring particularly to Figs. 3 and 7 each filter compartment is shown as provided with a filtering medium 23, an intermediate screen 24 for controlling the position of the filtering medium during application of the suction, supporting members 25 for said screen, and a solid back or outer wall 26. Said members are secured together and supported at their sides and at the inner and outer ends in any suitable manner as, for example, by frame members 27 secured together by bolts 27' and secured to the solid back or outer wall by bolts 28, said frame members serving also to enclose the sides and the inner and outer ends of the filter compartments. The frame members of adjacent compartments may also be secured together in any suitable manner, so as to form a complete rigidly connected filter. The central portion of the screen 24 for each compartment is preferably bowed or depressed outwardly away from the neutral position of the filtering medium, as shown, so that the filtering medium will be depressed upon application of suction and flattened or bowed inwardly toward the center of the filter upon application of pressure. A conduit is connected to the interior of each filter compartment, for example, by means of branch pipes or nipples 29 and 30 extending through the inner end wall thereof, the orifices in said nipples being preferably restricted so that the combined cross-sectional area thereof is not greater than the cross-sectional area of conduit 6. Said conduits extend inwardly along the spoke-like members 5 and within the flanges 5' thereof and are connected at their inner ends to passages 6' in the rotating valve member 11, each of said passages communicating with a port or opening 22 extending through the lower face of said valve member.

The stationary valve member 16 surrounds the extension 11' of the rotating valve member and bears tightly against the lower face of said rotating valve member, and may be held in engagement therewith by any suitable means such as suitably mounted springs not shown. Said stationary valve member is provided with a suction compartment 17' and a pressure compartment 18' separated by partitions 19. The suction compartment is of relatively large angular extent and is connected to a vacuum line 17 for maintaining the desired suction therein and for withdrawing filtered liquid from the apparatus. The pressure compartment 18' is of relatively small angular extent and is connected to a pressure line 18 for supplying the desired pressure for loosening the filtered solids or "filter cake" from the filter medium. The suction compartment communicates with an opening or port 20 opening through the upper face of the stationary valve member in position to reigster successively with the ports or openings 22 in the rotating valve member from a position somewhat in advance of the lowermost position of the respective filter compartments to a position just slightly preceding the uppermost position thereof, while the pressure compartment communicates with an opening 21 also adapted to register with the successive openings 22 when the respective filter compartments are substantially at their uppermost or vertical position. The direction of rotation of the apparatus is indicated by the arrows at A in Fig. 1 and Fig. 6.

The means for delivering the material to be filtered are shown as comprising launder 31 and spigot or pipe 32, which delivers the material upon a distributor box 33. Said distributor box extends inwardly over the filter compartments at a point somewhat in advance of the lowermost position thereof, and is open at the side from which the filter compartments approach the distributor, as shown at 33', so as to deliver the material to be filtered upon the filter medium of the respective filter compartments somewhat before they reach their lowermost position. The distributor may advantageously be provided with a plurality of spaced baffle members 52 having inwardly inclined slots 53 therebetween so as to direct the feed inwardly of the filter compartments and cause uniform distribution of the material thereover. A stationary scraper 36 is provided in position to engage the filter medium when the filter compartments pass their uppermost or vertical position and immediately following or concurrently with the application of pressure thereto, so as to assist in the discharging of filtered solids therefrom. A stationary baffle member 34 controls the direction of fall of the discharging solids and prevents stray portions of same from falling back into the unfiltered pulp. Scraper 36 and baffle 34 may be supported on a suitable supporting member 37.

In the operation of the above described filtering aparatus, the filter is rotated about the axis of the conoidal pyramid at any desired rate of speed. Vacuum is applied through line 17 to the suction compartment of the valve and pressure through line 18 to the presure compartment. The material to be filtered, consisting for example of a suspension of both coarse particles and fine slimes in water or other liquid, is then delivered through launder 31 and distributor 33 upon the filtering medium of the filter compartments when in substantially their lowermost position or somewhat in advance thereof. The coarser particles settle first upon the filtering medium due to their greater weight, followed by a portion of the somewhat finer material, while the liquid to be filtered passes through the filter medium due to the suction within the filtering compartment and is removed through conduit 6 and vacuum line 17. In some cases, however, a considerable proportion of the finer slimes may remain in suspension in the unfiltered material maintained upon the filtering medium, and the excess unfiltered material, containing these fine slimes but with the coarser particles substantially wholly removed therefrom, overflow through apertures 4 and discharge chutes 35.

In some operations it may be desirable to wash the partially dehydrated solids prior to discharging same from the apparatus, and for such cases any suitable washing means may be provided. Spraying means 54, shown in Figs. 1 and 8, provides a simple means for supplying water or other washing liquid to the filtering medium during upward movement thereof and while still within the region of suction application.

As the filtering compartments rise upwardly, the material remaining thereon is filtered, and is also washed if necessary, leaving a layer or cake of filtered solids on the surface of the filter medium. As each filtering compartment reaches a position adjacent the uppermost position thereof, the corresponding port 22 passes out of register with the suction port 20 and comes into register with the pressure port 21. Pressure is thereupon applied to the interior of said compartment, forcing the filtering medium outwardly away from the screen 24 into a substantially flat position or outwardly to a position bowed slightly away from the screen member. The filtered solids are, therefore, loosened from the filtering medium not only by the outward pressure of the air or other pressure medium, but also due to the bending or deformation of the filtering medium.

The scraper 36 also assists in removal of the filtered solids from the filtering medium, and the solids thus removed fall by gravity through the central aperture 50 onto any suitable means for conveying the same away. The baffles 7 and 8 prevent these discharged solids from striking or collecting upon the valve mechanism, while the baffle 34 prevents accidental return of such material to the body of unfiltered material in the lower part of the filter. The filtering medium, having discharged the solids accumulated thereon, returns again to the lower part of the filter to undergo a new cycle of operations.

I claim:

1. An apparatus for separating liquids from solids comprising a plurality of filtering compartments disposed at different angular positions about a common axis and inclined inwardly toward a common apex at one end of said axis, each of said compartments having a solid wall at the outside thereof and a filtering medium at the inside thereof, means securing said filtering compartments together to form a filter, means supporting said filter in position with said common axis inclined downwardly toward said apex end thereof and in such manner as to permit rotation of said filter about said axis, means for rotating said filter, means for applying suction to the respective filtering compartments when at the lower part of the filter and for applying pressure thereto when at the upper part of the filter, and means for maintaining a supply of material to be filtered in contact with the filtering medium of the respective compartments when said compartments are in position for application of suction thereto, said filtering compartments terminating at their inner ends a sufficient distance from said common apex to provide a central opening therebetween for discharge of solids from the filtering medium.

2. An apparatus for separating solids from liquids comprising a filter formed as a frustum of a conoidal pyramid and having a plurality of filter compartments disposed at different positions about the axis thereof and provided with filtering medium at the inner faces of said compartments, means rotatably supporting said filter with said axis inclined downwardly toward the apex end, means for rotating said filter about said axis, inwardly projecting baffles at the inner and outer edges of said filter defining a space inside the filter for receiving and maintaining material to be filtered upon the filtering medium of the respective compartments when in their lowermost position, the baffle at the outer edge of the filter being provided with apertures permitting overflow of excess unfiltered material therethrough and the baffle at the inner edge thereof defining a central aperture for discharge of filtered solids therethrough, means for feeding material to be filtered to said material receiving space, means for applying suction to the respective filtering compartments and removing filtered liquids therefrom when in their lowermost position and during the upward movement thereof, and means for applying pressure to the respective filter compartments when adjacent their uppermost position.

3. An apparatus as set forth in claim 2, and comprising in addition a scraper in position to assist in dislodging filtered solids from the filtering medium when the compartments are adjacent their uppermost position.

4. A suction filtering apparatus for separating liquids from solids comprising a plurality of filtering compartments disposed at different angular positions about a common axis and inclined inwardly toward a common apex at one end of said axis, each of said compartments having a solid wall at the outside thereof and a filtering medium at the inside thereof, means securing said filtering compartments together to form a filter, means supporting said filter in position with said common axis inclined downwardly toward said apex end thereof and in such a manner as to permit rotation of said filter about said axis, means for rotating said filter, means for applying suction to the respective filtering compartments when at the lower part of the filter and for applying pressure thereto when at the upper part of the filter, means for maintaining a supply of material to be filtered in contact with the filtering medium of the respective compartments when said compartments are in position for application of suction thereto, and baffle means at the inner and outer edges of the filter extending inwardly toward said axis so as to retain material to be filtered thereon, the baffle means at the outer edge having apertures permitting overflow of excess unfiltered material and said filtering compartments terminating at their inner ends a sufficient distance from said common apex to provide a central opening therebetween for discharge of solids from the filtering medium.

5. A suction filtering apparatus for separating liquids from solids comprising a plurality of filtering compartments disposed at different angular positions about a common axis and inclined inwardly at an angle of between 40 and 50 degrees toward a common apex at one end of said axis, each of said compartments having a solid wall at the outside thereof and a filtering medium at the inside thereof, means securing said filtering compartments together to form a filter, means supporting said filter in position with said common axis inclined downwardly toward said apex end thereof at an angle with respect to the horizontal approximately equal to the inward inclination of the filtering compartments with respect to said axis and in such a manner as to permit rotation of said filter about said axis, means for rotating said filter, means for applying suction to the respective filtering compartments when at the lower part of the filter and for applying pressure thereto when at the upper part of the filter, and means for maintaining a supply of material to be filtered in contact with the filtering medium of the respective compartments when said compartments are in position for application of suction thereto, said filtering compartments terminating at their inner ends a sufficient distance from said common apex to provide a central opening therebetween for discharge of solids from the filtering medium.

6. A suction filtering apparatus for separating liquids from solids comprising a plurality of filtering compartments disposed at different angular positions about a common axis and inclined inwardly at an angle of approximately 45° toward a common apex at one end of said axis, each of said compartments having a solid wall at the outside thereof and a filtering medium at the inside thereof, means securing said filtering compartments together to form a filter, means supporting said filter in position with said common axis inclined downwardly toward said apex end thereof at an angle approximately equal to the inward inclination of the filtering compartments toward said axis and in such manner as to permit rotation of said filter about said axis, means for rotating said filter, means for applying suction to the respective filtering compartments when at the lower part of the filter and for applying pressure thereto when at the upper part of the filter, and means for maintaining a supply of material to be filtered in contact with the filtering medium of the respective compartments when said compartments are in position for application of suction thereto, said filtering compartments terminating at their inner ends a sufficient distance from said common apex to provide a central opening therebetween for discharge of solids from the filtering medium, means for controlling discharge of filtered solids, and means for controlling flow of unfiltered material.

7. An apparatus for separating solids from liquids comprising a suction filter formed as a frustum of a conoidal pyramid and having a plurality of filter compartments disposed at different positions about the axis thereof and provided with filtering medium at the inner faces of said compartments, means rotatably supporting said filter with said axis inclined downwardly toward the apex end, means for rotating said filter about said axis, inwardly projecting baffles at the inner and outer edges of said filter defining a space inside the filter for receiving and maintaining material to be filtered upon the filtering medium of the respective compartments when in their lowermost position, means for feeding material to be filtered to said material receiving space, means for applying suction to the respective filtering compartments and removing filtered liquids therefrom when in their lowermost position and during the upward movement thereof, and means for applying pressure to the respective filter compartments when adjacent their uppermost position, said baffle at the outer edge of said filter being provided with apertures permitting overflow of excess unfiltered material therethrough, and the baffle at the inner edge thereof defining a central aperture for discharge of filtered solids therethrough.

8. An apparatus as set forth in claim 7, said apparatus also comprising a scraper in position to assist in dislodging filtered solids from the filtering medium when said compartments are adjacent their uppermost position.

9. An apparatus for separating liquids from solids comprising a suction filter formed as a frustum of a conoidal pyramid having an apex angle between 80 and 100 degrees and provided with filtering medium at the inner surface thereof, means defining a plurality of filtering compartments outside said filtering medium at different angular positions about the axis of the filter, means rotatably supporting said filter for rotation about said axis and with said axis inclined downwardly toward the apex end at an angle of between 40 and 50 degrees with respect to the horizontal, means for maintaining the supply of material to be filtered in contact with the filtering medium at the lower part of the filter, means for applying suction to the filtering compartments when at the lower part of the filter, and means for applying pressure to the filtering compartments when at the upper part of the filter, said filtering compartments terminating at their inner ends a sufficient distance from said common apex to provide a central opening therebetween for discharge of solids from the filtering medium, baffle means at the inner edge of said filtering compartments to prevent overflow of unfiltered material at that point and to define said central opening, and means for discharging excess unfiltered material separately from said solids.

10. An apparatus for separating liquids from solids comprising a suction filter formed as a frustum of a conoidal pyramid having an angle of approximately 90 degrees and provided with filter medium at the inner surface thereof, means defining a plurality of enclosed filtering compartments outside said filtering medium at different angular positions about the axis of the filter, means rotatably supporting said filter about its axis and with said axis inclined downwardly toward the apex end at an angle of approximately 45 degrees with respect to the horizontal, means for rotating said filter, means for delivering and maintaining a supply of material to be filtered upon the filtering medium at the lower portion of the filter, means for applying suction to the respective filtering compartments and removing filtered liquid therefrom when at the lower part of the filter and during upward movement thereof, means for discharging the filtered solids from the respective filtering media when at the upper part of the filter, said filtering compartments terminating at their inner ends a sufficient distance from the common apex thereof to provide a central aperture therebetween for discharging filtered material, a baffle at the inner edge of said filtering compartments restricting the flow of unfiltered material and defining said central aperture, and a baffle at the outer edge of the filter provided with apertures permitting overflow of excess unfiltered material therethrough.

11. An apparatus for separating solids from liquids comprising a suction filter formed as a frustum of a conoidal pyramid and having a plurality of filtering compartments disposed at different angular positions about the axis thereof, said compartments being provided with filtering medium at their inner faces, with solid walls at the outer faces thereof, and with means defining side and end walls so as to completely enclose the interior of each compartment, means rotatably supporting said filter with said axis inclined downwardly toward the apex at an angle such that the filtering compartments extend approximately horizontally when in their lowermost position, means for rotating said filter about said axis, means for delivering and maintaining a supply of material to be filtered upon the filtering medium of the respective compartments when adjacent their lowermost position, means for applying suction to the respective filtering compartments and removing filtered liquid therefrom when adjacent their lowermost position and during the upward movement thereof, said compartments terminating at their inner ends a sufficient distance from the common apex thereof to provide an aperture for discharging the filtered solids, means for discharging the filtered solids from the filtering medium of each compartment by gravity through said aperture when said compartment is adjacent the uppermost position, and means for preventing discharge of the unfiltered material with the filtered solids.

In testimony whereof I have hereunto subscribed my name this 19th day of July, 1930.

JAMES L. STEVENS.